United States Patent
Yano et al.

(10) Patent No.: US 8,741,480 B2
(45) Date of Patent: Jun. 3, 2014

(54) NON-AQUEOUS SECONDARY BATTERY COMPRISING A POLYVALENT ORGANIC LITHIUM SALT

(75) Inventors: Akira Yano, Kyoto (JP); Katsunori Kojima, Kyoto (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 77 days.

(21) Appl. No.: 13/474,232

(22) Filed: May 17, 2012

(65) Prior Publication Data

US 2012/0295156 A1 Nov. 22, 2012

(30) Foreign Application Priority Data

May 18, 2011 (JP) .................................. 2011-110920

(51) Int. Cl.
*H01M 4/131* (2010.01)
*H01M 10/056* (2010.01)

(52) U.S. Cl.
USPC ...... 429/200; 429/325; 429/231.95; 429/223; 429/224

(58) Field of Classification Search
USPC .............. 429/311, 313, 224, 307, 231.1, 200, 429/188, 325, 231.95, 223; 29/623.1
See application file for complete search history.

(56) References Cited

U.S. PATENT DOCUMENTS

| | | | |
|---|---|---|---|
| 5,593,795 A * | 1/1997 | Chen et al. | 429/313 |
| 5,631,104 A | 5/1997 | Zhong et al. | |
| 5,962,166 A * | 10/1999 | Ein-Eli et al. | 429/224 |
| 6,548,212 B1 * | 4/2003 | Heider et al. | 429/307 |
| 2007/0224504 A1* | 9/2007 | Kita et al. | 429/231.1 |
| 2011/0067230 A1* | 3/2011 | Tan et al. | 29/623.5 |

FOREIGN PATENT DOCUMENTS

| | | |
|---|---|---|
| JP | 9-147667 A | 6/1997 |
| JP | 11-73962 A | 3/1999 |

* cited by examiner

*Primary Examiner* — Kenneth Douyette
(74) *Attorney, Agent, or Firm* — Birch, Stewart, Kolasch & Birch, LLP

(57) ABSTRACT

The non-aqueous secondary battery of the present invention comprises a positive electrode containing a lithium-containing composite oxide as an active material, a negative electrode, a separator, and a non-aqueous electrolyte. The non-aqueous electrolyte contains polyvalent organic lithium salt, and the content of the polyvalent organic lithium salt is 0.001 parts by mass or more and 1 part by mass or less with respect to 100 parts by mass of all of the components of the non-aqueous electrolyte other than the polyvalent organic lithium salt.

6 Claims, 1 Drawing Sheet

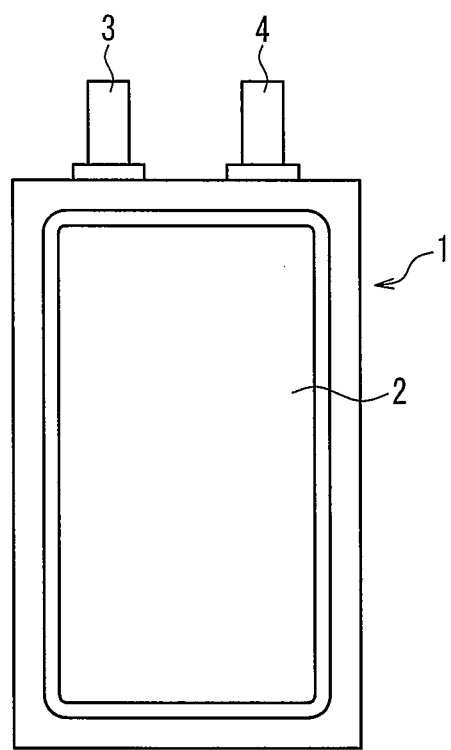

NON-AQUEOUS SECONDARY BATTERY COMPRISING A POLYVALENT ORGANIC LITHIUM SALT

BACKGROUND OF THE INVENTION

1. Field of the Invention

The present invention relates to a non-aqueous secondary battery capable of exhibiting excellent charge/discharge cycle characteristics even when being charged to a high voltage.

2. Description of Related Art

With the development of portable electronic devices such as portable phones and notebook personal computers and the commercialization of electric vehicles in recent years, there are needs for small, lightweight and high-capacity secondary batteries. As high-capacity secondary batteries that can satisfy such needs at present, non-aqueous secondary batteries (lithium-ion secondary batteries) using a lithium-containing composite oxide such as $LiCoO_2$ as a positive electrode active material and using a carbon material as a negative electrode active material have been introduced to the market. And as devices to which non-aqueous secondary batteries are applied are making further advancement, a larger capacity and larger energy density are required of non-aqueous secondary batteries, for example.

To increase the energy density of a battery, a high-capacity positive electrode active material or positive electrode active material capable of functioning at a high potential may be used. From the viewpoint of the latter, lithium-cobalt oxides with increased final voltage and spinel lithium-manganese oxides capable of functioning at a high potential have been studied at present.

For example, although $LiCoO_2$ is generally used in a battery to be charged at a voltage of 4.3V or less against lithium, it has been reported that a battery using an oxide obtained from the partial replacement of Co of $LiCoO_2$ with other metal element can be charged/discharged at a voltage of 4.4V or higher. Further, it has been found that a battery using the lithium-containing composite oxide represented by the general formula $LiNi_xM_yMn_{2-x-y}O_4$ (where M is at least one transition metal element other than Ni and Mn, and x satisfies $0.4 \leq x \leq 0.6$ and y satisfies $0 \leq y \leq 0.1$) can function at a potential of 4.5V or higher against lithium (e.g., JP 9-147867 A and JP 11-73962 A).

However, when the lithium-containing composite oxide represented by the general formula $LiNi_xM_yMn_{2-x-y}O_4$ discussed above or other positive electrode active material is used to form a battery, and the battery is charged at a high voltage, the positive electrode active material reacts with a non-aqueous electrolyte, which may lead to the deterioration of the charge/discharge cycle characteristics of the battery. Such deterioration of the charge/discharge cycle characteristics is more likely to occur when the battery is charged to 4.4V or higher against lithium, it is even more likely to occur when the battery is charged to 4.5V or higher against lithium, and the deterioration becomes particularly significant when the battery is charged to 5V or higher against lithium.

With the foregoing in mind, the present invention provides a non-aqueous secondary battery capable of exhibiting excellent charge/discharge cycle characteristics even when being charged at a high voltage.

SUMMARY OF THE INVENTION

The non-aqueous secondary battery of the present invention comprises a positive electrode containing a lithium-containing composite oxide as an active material, a negative electrode, a separator, and a non-aqueous electrolyte. The non-aqueous electrolyte contains polyvalent organic lithium salt, and the content of the polyvalent organic lithium salt is 0.001 parts by mass or more and 1 part by mass or less with respect to 100 parts by mass of all of the components of the non-aqueous electrolyte other than the polyvalent organic lithium salt.

According to the present invention, it is possible to provide a non-aqueous secondary battery capable of exhibiting excellent charge/discharge cycle characteristics even when being charged at a high voltage.

BRIEF DESCRIPTION OF THE DRAWINGS

FIG. 1 is a plan view of an exemplary non-aqueous secondary battery of the present invention.

DETAILED DESCRIPTION OF THE INVENTION

The non-aqueous secondary battery of the present invention comprises a positive electrode containing a lithium-containing composite oxide as an active material (positive electrode active material), a negative electrode, a separator, and a non-aqueous electrolyte containing polyvalent organic lithium salt.

When a non-aqueous electrolyte containing polyvalent organic lithium salt is used to form a non-aqueous secondary battery, the deterioration of the charge/discharge cycle characteristics can be suppressed even when the battery is charged to a high voltage (e.g., 4.3V or higher, preferably 4.4V or higher, more preferably 4.5V or higher, and even more preferably 5V or higher against lithium). This effect is assumed to be ensured due to the following facts.

The polyvalent organic lithium salt in the non-aqueous electrolyte is more prone to undergoing oxidation reaction than the main ingredients of the non-aqueous electrolyte such as an organic solvent and an electrolyte. Thus, when the battery is initially charged, the polyvalent organic lithium salt preferentially undergoes a reaction on the surface of the positive electrode, and the reaction product is deposited on the surface of a positive electrode active material. Since the surface of the positive electrode active material will be coated with a film of this deposit (deposition film), direct contact between the surface of the positive electrode and the non-aqueous electrolyte can be prevented, and the decomposition reaction of the non-aqueous electrolyte is thus suppressed. As a result, the deterioration of the charge/discharge cycle characteristics of the battery is suppressed.

Further, when the deposition film consisting of the reaction product of the organic lithium salt is formed on the surface of the positive electrode active material, necessary cell reaction may not proceed adequately as the movement of ions may be interrupted on the surface of the positive electrode active material, and thereby the battery characteristics may deteriorate. However, since the non-aqueous secondary battery of the present invention uses polyvalent organic lithium salt, ions can move smoothly on the surface of the positive electrode active material, and the deterioration of battery characteristics can thus be favorably suppressed.

The organic lithium salt according to the present invention is organic lithium salt having two or more lithium ions. Specifically, as long as the organic lithium salt is polyvalent, it may be bivalent, trivalent, tetravalent, and the like.

Specific examples of the polyvalent organic lithium salt include organic lithium salt represent by the general formula $R^1-(R^2)_a-(R^3Y)_b-R^4$, where $R^1$ and $R^4$ are each, for example, a hydrogen atom or alkyl group, and hydrogen atoms of the alkyl group may partially or entirely be replaced with fluorine atoms. Further, $R^1$ and $R^4$ may be the same or may be different from each other. $R^2$ and $R^3$ are each, for example, an organic chain such as alkylene, and hydrogen atoms of the organic chain may partially or entirely be replaced with fluorine atoms. "a" is an integer of 0 or more, and "b" is an integer of 2 or more. Y is an acid lithium salt group. Specifically, Y may be, for example, $-SO_3Li$, $-CO_2Li$, $-PF_dRf_{5-d}Li$ [where Rf is an alkyl group whose hydrogen atoms are entirely replaced with fluorine atoms (the same is true in the following) and "d" is an integer of 5 or less (the same is true in the following)], $-BF_eRf_{3-e}Li$ [where "e" is an integer of 3 or less (the same is true in the following)], and $-R_{3-g}PO_4Li_g$ [where R is an organic residue (the same is true in the following) and "g" is an integer of 3 or less (the same is true in the following)]. Y included in the polyvalent organic lithium salt may be one of those mentioned or may be two or more of those mentioned.

The polyvalent organic lithium salt represent by the general formula $R^1-(R^2)_a-(R^3Y)_b-R^4$ may include a hydroxyl group and an acid group. However, since these groups may undergo reaction in the battery, the number of these groups is preferably smaller than that of the lithium base(s) of an acid, and is more preferably 1/10 or less of the number of the lithium base(s) of an acid.

More specifically, the polyvalent organic lithium salt may be organic lithium salt having $-SO_3Li$, $-CO_2Li$, or $-R_{3-g}PO_4Li_g$ at both terminals of alkylene or may be organic lithium salt represented by the general formula $R^5-(CH_2CH_2)_n-(CH_2CHY^1)_m-R^6$ (where, $R^5$ and $R^6$ are each a hydrogen atom or alkyl group. Hydrogen atoms of the alkyl group may partially or entirely be replaced with fluorine atoms. Further, $R^5$ and $R^6$ may be the same or may be different from each other. $Y^1$ is $-SO_3Li$ or $-CO_2Li$. "n" is an integer of 0 or more and "m" is an integer of 2 or more.).

Further, the polyvalent organic lithium salt preferably contains a fluorine atom. Examples of such polyvalent organic lithium salt include organic lithium salts having $-SO_3Li$, $-CO_2Li$, $-PF_dRf_{5-d}Li$, $-BF_eRf_{3-e}Li$, $-R_{3-g}PO_4Li_g$, or the like at both terminals of alkylene whose hydrogen atoms are partially or entirely replaced with fluorine atoms.

Further, as the polyvalent organic lithium salt, it is also possible to use organic lithium salt represented by the general formula $R^7-(R^8)_o-(C_qF_rH_sY^2)_p-R^9$, where $R^7$ and $R^9$ are each a hydrogen atom or alkyl group, and hydrogen atoms of the alkyl group may partially or entirely be replaced with fluorine atoms. Further, $R^7$ and $R^9$ may be the same or may be different from each other. $R^8$ is, for example, an organic chain such as alkylene, and hydrogen atoms of the organic chain may partially or entirely be replaced with fluorine atoms. $Y^2$ is $-SO_3Li$, $-CO_2Li$, $-PF_dRf_{5-d}Li$, $-BF_eRf_{3-e}Li$, $-R_{3-g}PO_4Li_g$, $-N(RfSO_2)Li$, or $-C(RfSO_2)_2Li$. "o", "q", "r" and "s" are each an integer of 0 or more, and "p" is an integer of 2 or more.

More preferred examples of the polyvalent organic lithium salt include $LiSO_3-Rf'-SO_3Li$ [where Rf' is an organic chain such as alkylene whose hydrogen atoms are partially or entirely replaced with fluorine atoms (the same is true in the following)], $LiCO_2-Rf'-CO_2Li$, $LiPF_5-PF_5Li$, and $LiBF_3-Rf'-BF_3Li$.

In terms of favorably ensuring the effects resulting from the use of the polyvalent organic lithium salt, the amount of the polyvalent organic lithium salt contained in the non-aqueous electrolyte for use in the non-aqueous secondary battery is 0.001 parts by mass or more, preferably 0.01 parts by mass or more, and more preferably 0.05 parts by mass or more, where the total amount of all of the components of the non-aqueous electrolyte other than the polyvalent organic lithium salt is 100 parts by mass. If the amount of the polyvalent organic lithium salt is excessive in the non-aqueous electrolyte, the deposition film consisting of the reaction product of the organic lithium salt formed on the surface of the positive electrode active material becomes too large in thickness, and thereby the battery characteristics may deteriorate. For this reason, the amount of the polyvalent organic lithium salt contained in the non-aqueous electrolyte for use in the non-aqueous secondary battery is 1 part by mass or less, where the total amount of all of the components of the non-aqueous electrolyte other than the polyvalent organic lithium salt is 100 parts by mass.

For the non-aqueous electrolyte in which the polyvalent organic lithium salt is contained, an electrolyte obtained by dissolving electrolyte salt, such as lithium salt, in an organic solvent is used.

The organic solvent is not particularly limited, and examples of the organic solvent include: chain esters such as dimethyl carbonate, diethyl carbonate, ethyl methyl carbonate, and methyl propyl carbonate; cyclic esters with a high dielectric constant such as ethylene carbonate, propylene carbonate, butylene carbonate and vinylene carbonate; and mixed solvents of chain esters and cyclic esters. A mixed solvent of chain ester and cyclic ester with the chain ester being the main solvent is particularly suitable.

Examples of the electrolyte salt include lithium salts such as $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiCnF_{2n+1}SO_3$ (where n satisfies $2 \leq n \leq 7$), $LiN(RF^1SO_2)(Rf^2SO_2)$ [where $RF^1$ and $Rf^2$ are each a fluoroalkyl group (the same is true in the following)], $LiC(RF^1SO_2)_3$, and $LiN(RF^1OSO_2)_2$. These lithium salts may be used individually or in combination of two or more. The concentration of the electrolyte salt in the non-aqueous electrolyte is not particularly limited but is preferably 0.3 mol/L or more, and more preferably 0.4 mol/L or more, and is preferably 1.7 mol/L or less, and more preferably 1.5 mol/L or less. Note that the present invention treats $Li_2C_2F_4(SO_3)_2$ as electrolyte salt although $Li_2C_2F_4(SO_3)_2$ is polyvalent organic lithium salt. This is because $Li_2C_2F_4(SO_3)_2$ is highly soluble in electrolyte and the effect of coating the surface of a positive electrode active material cannot be expected so much from it.

Further, a gelling agent including a polymer and the like may be used to make the non-aqueous electrolyte in the form of a gel.

The positive electrode of the non-aqueous secondary battery according to the present invention includes, for example, a current collector and a positive electrode mixture layer formed on one side or both sides of the current collector and containing a lithium-containing composite oxide as a positive electrode active material, a conductive assistant, a binder, and the like.

Examples of the positive electrode active material that is used in the positive electrode of the non-aqueous secondary battery of the present invention include lithium-containing composite oxides such as $LiCoO_2$ used at a voltage of 4.3V or less against lithium, lithium-containing composite oxides usable at a voltage of 4.4V or higher against lithium (e.g., those obtained from the partial replacement of Co of $LiCoO_2$ with other metal element such as Ti, Zr, Mg and Al), and lithium-containing composite oxides usable even at a voltage of 5V or higher against lithium (e.g., lithium-manganese oxide obtained from the replacement of a manganese site with other metal element). Examples of the lithium-manganese oxide include composite oxide represented by the general formula $LiNi_xM_yMn_{2-x-y}O_4$, where M is at least one metal element other than Ni, Mn, and Li, x satisfies $0.4 \leq x \leq 0.6$, and y satisfies $0 \leq y \leq 0.1$. Further, in the above general formula, the metal element M is preferably any of Cr, Fe, Co, Cu, Zn, Ti, Al, Mg, Ca, and Ba. Among these, Fe and Co are more preferred because more favorable characteristics can be achieved. For the positive electrode active material used in the positive electrode according to the present invention, these lithium-containing composite oxides may be used individually or in combination of two or more. Among these positive electrode active materials, the lithium-containing composite oxide has a stable structure even at a higher voltage and provides the battery which is possible to charge at a higher voltage. Therefore the lithium-containing composite oxide is preferred because the capacity of the battery can be increased.

The deterioration of the charge/discharge cycle characteristics of a battery caused by a reaction between a positive electrode active material and a non-aqueous electrolyte in the battery becomes more significant at a higher charging voltage. However, in the non-aqueous secondary battery of the present invention, the deterioration of the charge/discharge cycle characteristics can be favorably suppressed even when the charging voltage is 5V or higher because of the effects resulting from the polyvalent organic lithium salt as discussed above. Thus, the effects manifest themselves noticeably when the lithium-containing composite oxide usable at a higher voltage is used in the present invention.

Generally, the positive electrode mixture layer of the positive electrode includes conductive assistants. As in conventional non-aqueous secondary batteries, graphites, carbon blacks (e.g., acetylene black and Ketjen Black), amorphous carbon materials such as carbon materials with amorphous carbon being formed thereon, fibrous carbons (e.g., vapor-grown carbon fibers and carbon fibers obtained by spinning pitch and carbonizing the spun pitch), and carbon nanotubes (a variety of carbon nanotubes including multilayer and single layer carbon nanotubes) can be used as conductive assistants for use in the positive electrode. These materials may be used individually or in combination of two more as conductive assistants for use in the positive electrode.

Among the conductive assistants mentioned, it is preferable to use an amorphous carbon material and fibrous carbon or carbon nanotube in combination. The positive electrode using such conductive assistants can result in a non-aqueous secondary battery with improved charged/discharge cycle characteristics and load characteristics.

For example, when graphite is used as a positive electrode conductive assistant to form a battery, and the battery is charged to 4.5V or higher, intercalation of anions into graphite from a non-aqueous electrolyte, for example, intercalation of $PF_6$ complex ions into graphite occurs, as expressed by the following formula: $C_{24}+PF_6 \rightarrow C_{24}(PF_6)+e^-$.

When the above reaction occurs, the interlayer distance of graphite is widened and graphite particles expand, causing a gap between the positive electrode active material and graphite. As a result, graphite loses its function as a conductive assistant, and the charge/discharge cycle characteristics of the positive electrode may thus deteriorate. However, when an amorphous carbon material is used as a conductive assistant in combination with the graphite, changes in the crystal size are less likely to occur even if the intercalation of $PF_6$ complex ions takes place. For this reason, the conductivity within the positive electrode mixture layer can be favorably maintained.

Since the amorphous carbon material generally has a large specific surface area and their bulk is large, it is difficult to increase a positive electrode mixture layer in density when the amorphous carbon material is used in the positive electrode mixture layer and an increase in the capacity of the battery may thus be prevented. However, by using fibrous carbon or carbon nanotube together with the amorphous carbon material, the filling property of the conductive assistants in the positive electrode mixture layer can be improved. As a result, the capacity of the battery can be further increased while the effects resulting from the use of the amorphous carbon material can be ensured.

The amorphous carbon material preferably has an average particle size of 1 μm or less and more preferably 100 nm or less. This is because particles of the amorphous carbon material having such an average particle size can easily burrow their way into space between positive electrode active material particles when forming a positive electrode mixture layer, and the filling property is improved. The amorphous carbon material's ability to retain a non-aqueous electrolyte becomes higher as its average particle size is smaller, and thus the characteristics of the positive electrode can be improved. However, since it is difficult to produce extremely small amorphous carbon materials, those having an average particle size of up to about 1 nm are practical.

In terms of improving the filling property of the positive electrode mixture layer to facilitate an increase in the filling rate, fibrous carbon and carbon nanotube have an average particle size of preferably 10 μm or less, more preferably 1 μm or less, and even more preferably 100 nm or less. Further, fibrous carbon and carbon nanotube have an average particle size of preferably 10 nm or more.

The average particle size of each of the amorphous carbon material, fibrous carbon, carbon nanotube and lithium-containing composite oxide (described below) as used herein refers to D50 as the value of the diameter of particles with an accumulated volume percentage of 50% on a volume basis measured by a laser diffraction/scattering particle size distribution analyzer.

When using an amorphous carbon material and a fibrous carbon material or carbon nanotube in combination, the amorphous carbon material makes up preferably 15 mass % or more (in terms of amount), more preferably 30 mass % or more and even more preferably 50 mass % or more of all of the conductive assistants used in the positive electrode. When the amorphous carbon material is used in such an amount, changes in the lattice size can be suppressed even if the intercalation of $PF_6$ complex ions into the carbon materials occurs, so that favorable conductivity can be maintained. However, when the amount of the amorphous carbon material is excessive, the density of the positive electrode mixture layer may decline. For this reason, the amorphous carbon material makes up preferably 85 mass % or less (in terms of amount) of all of the conductive assistants used in the positive electrode.

In order to increase the density of the positive electrode mixture layer to increase the capacity of the positive electrode, the lithium-containing composite oxide as a positive electrode active material has an average particle size of preferably 0.05 to 30 μm, and it is preferable that the average particle size of each conductive assistant is smaller than or equal to that of the lithium-containing composite oxide. That is, it is preferable that the lithium-containing composite oxide and each conductive assistant establish the relationship $Rg \leq Rm$, where Rm (nm) is the average particle size of the lithium-containing composite oxide and Rg (nm) is the average particle size of each conductive assistant.

It is preferable that the positive electrode according to the present invention is produced by mixing the lithium-containing composite oxide as a positive electrode active material, conductive assistants, a binder, and the like with each other to obtain a positive electrode mixture, dispersing the positive electrode mixture in a solvent to prepare a positive electrode mixture containing paste (in this case, the binder may have already been dissolved or dispersed in the solvent), applying the positive electrode mixture containing paste onto the surface of a current collector made of a metal foil, drying the applied paste to form a positive electrode mixture layer, and optionally applying pressure to the current collector. Further, when using an amorphous carbon material and fibrous carbon or carbon nanotube in combination as the conductive assistants as discussed above, it is preferable to mix the amorphous carbon material and fibrous carbon or carbon nanotube with each other before mixing the components to obtain the positive electrode mixture. This more favorably ensures the effects resulting from the combined use of the amorphous carbon material and fibrous material or carbon nanotube. It should be noted that the method of producing the positive electrode according to the present invention is not limited to this, and the positive electrode may be produced by other methods.

Examples of the binder for use in the positive electrode include polyvinylidene fluoride (PVDF), polytetrafluoroethylene, polyacrylic acid, and stylene-butadiene rubber.

The surface of the lithium-containing composite oxide and the surface of the positive electrode mixture layer may be coated with an organic compound other than the polyvalent organic lithium salt or with an inorganic compound such as $Al_2O_3$, $AlPO_4$, $ZrO_2$, or $AlOOH$.

In the positive electrode mixture layer of the positive electrode according to the present invention, it is preferable that the amount of the lithium-containing composite oxide as a positive electrode active material is 70 to 90 mass % and the amount of the binder is 1 to 30 mass %, for example. Further, when using conductive assistants, the amount of the conductive assistants in the positive electrode mixture layer is preferably 1 to 20 mass %. Furthermore, the thickness of the positive electrode mixture layer is preferably 1 to 100 µm per one side of the current collector.

For the current collector of the positive electrode, a metal foil, punched metal, expanded metal, metal mesh or the like made of aluminum, stainless steel, nickel, titanium or alloy thereof can be used. Generally, an aluminum foil having a thickness of 10 to 30 µm is suitably used.

For the negative electrode of the non-aqueous secondary battery of the present invention, it is possible to use a negative electrode including, for example, a current collector and a negative electrode mixture layer formed on one side or both sides of the current collector and containing a negative electrode active material, a binder and the like.

The negative electrode active material is not particularly limited as long as it is capable of doping and de-doping lithium ions. Example of the negative electrode active material include carbon materials such as graphites, pyrolytic carbons, cokes, glassy carbons, calcinated organic polymer compounds, mesocarbon microbeads, carbon fibers and active carbons. Further, lithium or lithium-containing compounds can also be used as the negative electrode active material. Examples of lithium-containing compounds include tin oxides, silicon oxides, nickel-silicon alloy, magnesium-silicon alloy, tungsten oxides, and lithium-iron composite oxides as well as lithium alloys such as lithium-aluminum alloy, lithium-zinc alloy, lithium-indium alloy, lithium-gallium alloy, and lithium-indium-gallium alloy. When produced, some of these negative electrode active materials may not contain lithium, but they will contain lithium when being charged.

The negative electrode is produced by, for example, mixing the negative electrode active material and optionally a conductive assistant (e.g., one similar to those discussed above in connection with the positive electrode) and a binder (e.g., one similar to those discussed above in connection with the positive electrode) with each other to obtain a negative electrode mixture, dispersing the negative electrode mixture in a solvent to prepare a negative electrode mixture containing paste (the binder may have been already dissolved or dispersed in the solvent), applying the negative electrode mixture containing paste onto the surface of a current collector, drying the applied paste to form a negative electrode mixture layer, and optionally applying pressure to the current collector. It should be noted that the method of producing the negative electrode is not limited to this, and the negative electrode may be produced by other methods.

In the negative electrode mixture layer of the negative electrode, it is preferable that the amount of the negative electrode active material is 70 to 99 mass % and the amount of the binder is 1 to 30 mass %. Further, when using a conductive assistant, the amount of the conductive assistant in the negative electrode mixture layer is preferably 1 to 20 mass %. Furthermore, the thickness of the negative electrode mixture layer is preferably 1 to 100 µm per one side of the current collector.

As the current collector of the negative electrode, a metal foil, punched metal, expanded metal, metal mesh or the like made of copper, stainless steel, nickel, titanium or alloy thereof can be used. Generally, a copper foil having a thickness of 5 to 30 µm is suitably used.

For example, the positive electrode and the negative electrode discussed above are laminated via a separator and used in the form of a laminated electrode body or in the form of a wound electrode body obtained by further winding the laminated electrode body spirally.

The separator desirably has adequate strength and is capable of retaining an electrolyte in large amount. Thus, from such a viewpoint, it is preferable to use a microporous film or unwoven fabric including polyethylene, polypropylene or ethylene-propylene copolymer and having a thickness of 10 to 50 µm and a porosity of 30 to 70%.

The non-aqueous secondary battery of the present invention may be in the form of a cylindrical (circular or rectangular cylindrical) battery using, for example, a steel or aluminum outer can. Further, the non-aqueous secondary battery of the present invention may be in the form of a soft package battery using a metal-deposited laminated film as an outer package.

The non-aqueous secondary battery of the present invention can be produced in the same manner as in conventionally-known methods for producing non-aqueous secondary batteries by using a non-aqueous electrolyte containing the polyvalent organic lithium salt, a positive electrode containing the lithium-containing composite oxide as a positive electrode active material, a negative electrode (e.g., the negative electrode discussed above), a separator (e.g., the separator discussed above) and the like as discussed above.

Even when the non-aqueous secondary battery of the present invention is charged at a high voltage, the deterioration of the charge/discharge cycle characteristics can be suppressed. Thus, the non-aqueous secondary battery of the present invention has a high capacity and favorable charge/discharge cycle characteristics. By taking advantage of these characteristics, the battery of the present invention can be preferably used as a power source for a variety of devices such as electronic devices (in particular, portable electronic devices such as portable phones and notebook personal computers), power systems, and conveyances (e.g., electric vehicles and electric bicycles).

Hereinafter, the present invention will be described in detail by way of Examples. It should be noted that the present invention is not limited to Examples described below. The average particle size of each of the lithium-containing composite oxide ($LiNi_{0.5}Mn_{1.5}O_4$), the amorphous carbon material and the carbon nanotube used in Examples is D50 measured by a laser diffraction/scattering particle size distribution analyzer "MICROTRAC HRA 9320-X100" manufactured by Honeywell Inc.

Example 1

Production of Positive Electrode

As a positive electrode active material, $LiNi_{0.5}Mn_{1.5}O_4$ in the form of fine particles having an average particle size of 5 μm was used. This active material corresponds to a lithium-containing composite oxide represented by the general formula $LiNi_xM_yMn_{2-x-y}O_4$, where x is 0.5 and y is 0.

As conductive assistants, 2 parts by mass of an amorphous carbon material (interlayer distance: 0.363 nm, specific surface area: 50 $m^2$/g, average particle size: 50 nm) and 1 part by mass of carbon nanotube having an average particle size of 10 μm or less (interlayer distance: 0.343 nm, specific surface area: 270 $m^2$/g) were mixed with each other to obtain a carbon material mixture.

Next, 93 parts by mass of $LiNi_{0.5}Mn_{1.5}O_4$, 3 parts by mass of the carbon material mixture, and 4 parts by mass of PVDF were mixed with each other to obtain a positive electrode mixture, and the positive electrode mixture was dispersed in N-methyl-2-pyrolidone (NMP) to prepare a positive electrode mixture containing paste. This positive electrode mixture containing paste was applied onto one side of a current collector made of an aluminum foil having a thickness of 15 μm, and the applied paste was dried to form a positive electrode mixture layer. After carrying out pressing, drying was carried out at 120° C., thus obtaining a positive electrode. This positive electrode was cut, and leads were welded to an exposed portion of the aluminum foil. In the positive electrode obtained, the thickness of the positive electrode mixture layer was 55 μm.

<Production of Negative Electrode>

92 parts by mass of graphite as a negative electrode active material and 8 parts by mass of PVDF were mixed with each other to obtain a negative electrode mixture, and this negative electrode mixture was dispersed in NMP to prepare a negative electrode mixture containing paste. This negative electrode mixture containing paste was applied onto both sides of a current collector made of a copper foil having a thickness of 10 μm, and the applied paste was dried to form negative electrode mixture layers, followed by pressing, thus obtaining a negative electrode. The negative electrode was cut, and leads were welded to an exposed portion of the copper foil, and thereafter, the negative electrode was dried in a vacuum at 120° C. for 15 hours. In the negative electrode obtained, the negative electrode mixture layers each had a thickness of 60 μm (i.e., thickness per one side of the current collector).

<Preparation of Non-Aqueous Electrolyte>

In a mixed solvent of ethylene carbonate and diethyl carbonate at a volume ratio of 2:5, $LiPF_6$ was dissolved at a concentration of 1.3 mol/L. Then, 1 mass % of propane sultone and 1 mass % of vinylene carbonate were added to the mixed solvent to obtain a non-aqueous electrolyte, and 0.2 parts by mass of $LiSO_3CF_2CF_2CF_2SO_3Li$ as polyvalent organic lithium salt was further dissolved in 100 parts by mass of the non-aqueous electrolyte, thus preparing the non-aqueous electrolyte for use in the battery of Example 1.

<Assembly of Battery>

Two positive electrodes and one negative electrode obtained above were laminated via microporous polyethylene films (thickness: 16 μm) such that the negative electrode was interposed between the positive electrodes and each positive electrode mixture layer opposed each negative electrode mixture layer, and they were fixed with tape, thus obtaining a laminated electrode body. This laminated electrode body and an Li foil as a reference electrode for measuring a potential were inserted into a laminate film outer package, and the rim of the outer package was sealed by welding except for one portion. Next, the non-aqueous electrolyte was injected into the outer package through the unsealed portion of the rim of the outer package, and then the outer package was completely sealed by welding, thus obtaining a non-aqueous secondary battery.

FIG. 1 is a plan view of the non-aqueous secondary battery obtained. In the non-aqueous secondary battery 1 of this example shown in FIG. 1, the laminated electrode body and the non-aqueous electrolyte are contained in the outer package 2 made of an aluminum laminate film and having a rectangular shape when seen in a plan view. A positive electrode external terminal 3 and a negative electrode external terminal 4 are drawn out from the same side of the outer package 2. It should be noted that a terminal drawn out from the reference electrode is not illustrated.

Example 2

A non-aqueous secondary battery was produced in the same manner as in Example 1 except that the content of $LiSO_3CF_2CF_2CF_2SO_3Li$ in the non-aqueous electrolyte was 0.02 parts by mass with respect to a total of 100 parts by mass of all of the components of the non-aqueous electrolyte other than $LiSO_3CF_2CF_2CF_2SO_3Li$.

Example 3

A non-aqueous secondary battery was produced in the same manner as in Example 1 except that the content of $LiSO_3CF_2CF_2CF_2SO_3Li$ in the non-aqueous electrolyte was 0.8 parts by mass with respect to a total of 100 parts by mass of all of the components of the non-aqueous electrolyte other than $LiSO_3CF_2CF_2CF_2SO_3Li$.

Comparative Example 1

A non-aqueous secondary battery was produced in the same manner as in Example 1 except that $LiSO_3CF_2CF_2CF_2SO_3Li$ was not included in the non-aqueous electrolyte.

Comparative Example 2

A non-aqueous secondary battery was produced in the same manner as in Example 1 except that the content of $LiSO_3CF_2CF_2CF_2SO_3Li$ in the non-aqueous electrolyte was 1.2 parts by mass with respect to a total of 100 parts by mass of all of the components of the non-aqueous electrolyte other than $LiSO_3CF_2CF_2CF_2SO_3Li$.

The charge/discharge cycle characteristics of each of the non-aqueous secondary batteries of Examples 1 to 3 and Comparative Examples 1 to 2 were evaluated as follows.

First, each of the batteries was charged at a constant current of 0.2 C until the battery voltage reached 5V, and then was discharged at a constant current of 0.2 C until the final voltage became 3.5V. A series of these operations was determined as 1 cycle, and each of the batteries was charged/discharged until 20 cycles elapsed. Thereafter, each of the batteries was charged at a constant current of 0.2 C until the positive electrode potential became 5V with respect to the reference electrode potential, and then was discharged at a constant current of 1 C until the final voltage became 3.5 V, and the discharge capacity (1 C discharge capacity after 20 cycles of charging/discharging) of each of the batteries was determined. The results are provided in Table 1 together with the configuration of each positive electrode. The discharge capacity of each battery provided in Table 1 is a relative value, taking the discharge capacity of the battery of Comparative Example 1 as 100. Further, "Content of polyvalent lithium salt" in Table 1 refers to the amount (parts by mass) of the polyvalent organic lithium salt with respect to a total of 100 parts by mass of all of the components of the non-aqueous electrolyte other than the polyvalent organic lithium salt

TABLE 1

|  | Content of polyvalent organic lithium salt (parts by mass) | 1 C discharge capacity after 20 cycles of charging/discharging |
|---|---|---|
| Ex. 1 | 0.2 | 124 |
| Ex. 2 | 0.02 | 110 |
| Ex. 3 | 0.8 | 106 |
| Comp. Ex. 1 | 0 | 100 |
| Comp. Ex. 2 | 1.2 | 97 |

As can be seen from the results provided in Table 1, the 1 C discharge capacity of each of the non-aqueous secondary batteries of Examples 1 to 3 was larger than that of the battery of Comparative Example 1 after 20 cycles of charging/discharging, showing that the batteries of Examples 1 to 3 had excellent charge/discharge cycle characteristics. In contrast, the 1 C discharge capacity of the battery of Comparative Example 2 using the non-aqueous electrolyte with increased $LiSO_3CF_2CF_2CF_2SO_3Li$ content was smaller than that of the battery of Comparative Example 1 after 20 cycles of charging/discharging.

After the evaluation of the charge/discharge cycle characteristics, the non-aqueous secondary battery of Example 1 was disassembled to take out the positive electrodes, and each positive electrode was analyzed using an X-ray photoelectron spectrometer (XPS) to determine the composition and the chemical conditions on its surface. As a result, F and S were detected from the surface layer, and it was found that F and S were present in the forms of a C—F bond and an S—O bond, respectively. From these results, it was found that a coating derived from $LiSO_3CF_2CF_2CF_2SO_3Li$ was formed on the surface of each positive electrode.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A non-aqueous secondary battery comprising a positive electrode containing a lithium-containing composite oxide as an active material, a negative electrode, a separator, and a non-aqueous electrolyte,
   wherein the non-aqueous electrolyte contains polyvalent organic lithium salt,
   the content of the polyvalent organic lithium salt is 0.001 parts by mass or more and 1 part by mass or less with respect to 100 parts by mass of all of components of the non-aqueous electrolyte other than the polyvalent organic lithium salt, and
   the polyvalent organic lithium salt includes at least one selected from the group consisting of $LiSO_3$—Rf—$SO_3Li$, $LiCO_2$—Rf—$CO_2Li$, $LiPF_5$—Rf—$PF_5Li$, and $LiBF_3$—Rf—$BF_3Li$, where Rf is an organic chain whose hydrogen atoms are partially or entirely replaced with fluorine atoms.

2. The non-aqueous secondary battery according to claim 1, wherein the polyvalent organic lithium salt contains a fluorine atom.

3. The non-aqueous secondary battery according to claim 1, wherein the lithium-containing composite oxide can be used in the battery to be charged at a voltage of 4.4V or higher against lithium.

4. The non-aqueous secondary battery according to claim 3, wherein the lithium-containing composite oxide is represented by the general formula $LiNi_xM_yMn_{2-x-y}O_4$, where M is at least one metal element other than Ni, Mn and Li, x satisfies $0.4 \leq x \leq 0.6$, and y satisfies $0 \leq y \leq 0.1$.

5. The non-aqueous secondary battery according to claim 1, wherein the non-aqueous electrolyte contains $LiPF_6$ or $LiBF_4$ as an electrolyte salt.

6. The non-aqueous secondary battery according to claim 5, wherein the concentration of the electrolyte salt in the non-aqueous electrolyte is 0.3 mol/L or more and 1.7 mol/L or less.

* * * * *